Patented May 13, 1930

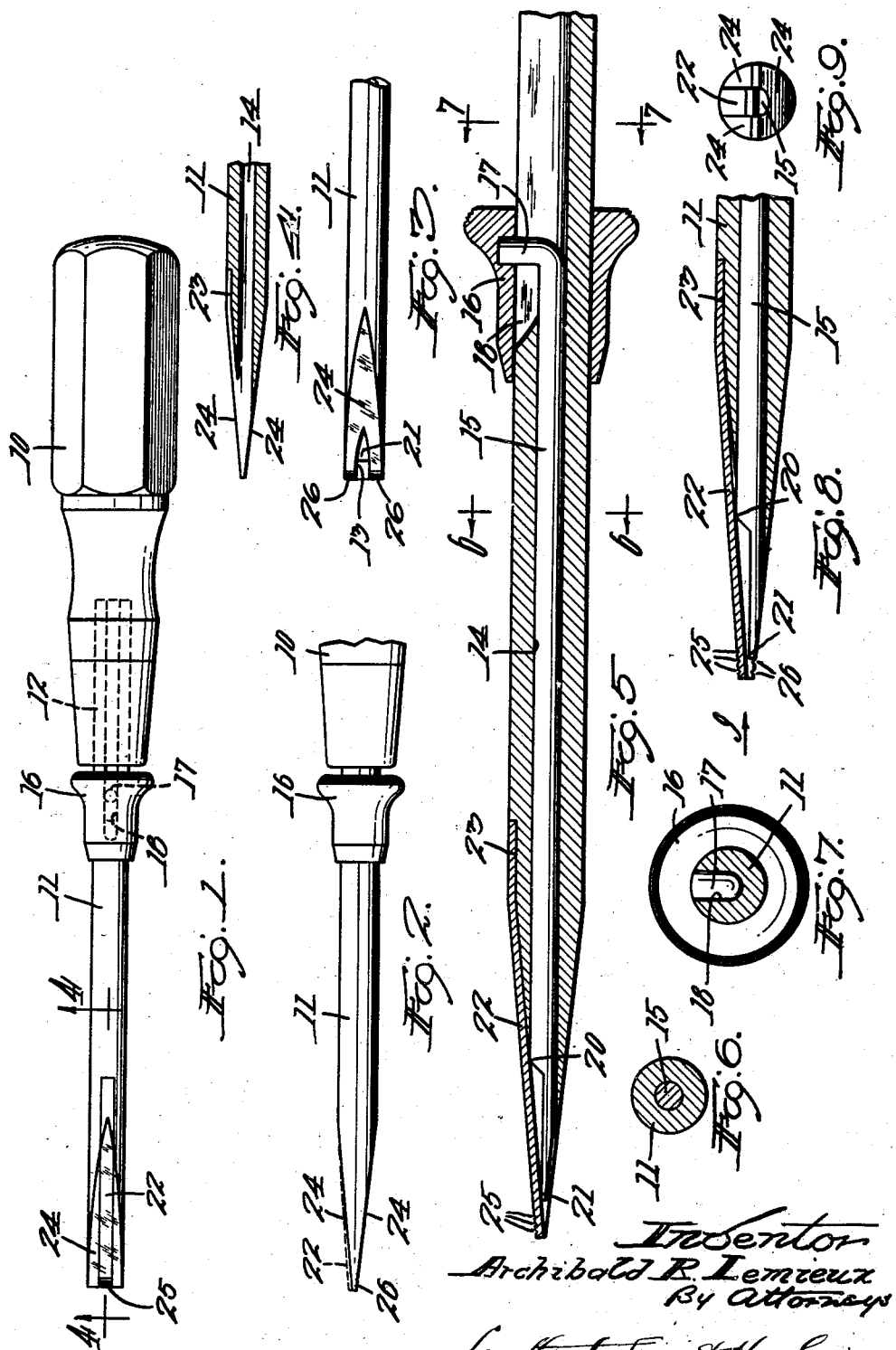

1,758,162

UNITED STATES PATENT OFFICE

ARCHIBALD R. LEMIEUX, OF WORCESTER, MASSACHUSETTS

SCREW DRIVER

Application filed August 22, 1929. Serial No. 387,764.

The objects of this invention are to provide a screw-driver with a simple and efficient means for expanding the blade thereof transversely, after the screw-driver is set into the slot of the screw, so as to make the screw-driver blade the full width of the slot and thus reduce danger of its slipping out again and also make it possible to expand it far enough so that the screw-driver will be held in the slot by pressure of the parts against the opposite sides thereof.

Other objects and advantages of the invention will appear hereinafter.

Reference is to be had to the accompanying drawings in which

Fig. 1 is a side view of a screw-driver constructed in accordance with this invention;

Fig. 2 is an edge view;

Fig. 3 is a side view of the side opposite that shown in Fig. 1 with the parts in unexpanded condition;

Fig. 4 is a sectional view on the line 4—4 of Fig. 1 and not showing the expanding rod;

Fig. 5 is a similar sectional view on enlarged scale showing all the parts;

Figs. 6 and 7 are sectional views on the lines 6—6 and 7—7 respectively of Fig. 5;

Fig. 8 is a longitudinal sectional view of the end of the screw-driver with the parts expanded, and Fig. 9 is an enlarged end view showing the parts in expanded condition.

The screw-driver is provided with a handle 10 and blade 11 having the usual tang 12 extending into the handle. This blade is provided with a longitudinal passage 14 in which operates a rod 15. When this passage emerges through the converging sides at the tip a slot 13 is left through it at the extreme end. This rod is provided with a knurled head 16 having a radial perforation fitting a transverse end 17 on the rod 15. This end operates in a slot 18 extending along the blade. This rod therefore can be moved up and down the blade.

At the end the expanding rod is provided with two bearing points 20 and 21 which are adapted to engage a spring steel plate 22 welded to the blade 11 along a surface 23 and projecting into a slot cut all the way through the blade. This plate is capable of being pushed out by the bearing points 20 and 21 from the position shown in Figs. 2 and 5 to the position shown in dotted lines in Fig. 2 and in full lines in Figs. 8 and 9. It will be noticed that this plate 22 is located at an angle to the length of the rod 15 and when the rod is withdrawn, as shown in Fig. 8, it springs back into substantially the same plane as the slanting flat surface 24 of the blade of the screw-driver.

The extreme ends of the plate 22 and the blade 11 preferably are scored or notched at 25 and 26 on opposite sides to assist in holding the screw-driver in the screw slot, thus avoiding smooth surfaces coming against the slot.

In operation it is obvious that with the parts in the unexpanded position shown in Fig. 5, the tip end of the blade can be received in the screw slot the head 16 moved down by the thumb conveniently to force the rod against the edge of the plate 22 and force it outwardly, as shown, especially in Fig. 9. This action causes the thickness of the blade to take up the whole width of the screw slot and to wedge it into the slot. This results in holding the screw-driver in the slot and adds greatly to the convenience of manipulating screws.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. As an article of manufacture, a screw-driver having a rigid blade extending to the tip provided with a central longitudinal passage therethrough, a rod movable in said passage, and a spring plate located on one side of the blade, said rod being adapted to engage said spring plate and force it outwardly to increase the effective thickness of the tip end of the blade.

2. As an article of manufacture, a screw-driver having a blade provided with a longitudinal passage therein and having a recess along one side in the surface of the tip end thereof, a spring plate located in said recess and normally having its outer surface in the plane of the surface of the tip of the blade, and a rod in said passage adapted to engage said spring plate and force it outwardly to increase the effective thickness of the tip end of the blade.

3. As an article of manufacture, a screwdriver having a rigid blade extending to the tip provided with a passage extending centrally through it from end to end, and having one side slanted off on a small angle clear to the tip exposing said passage, a spring plate mounted on that side and having its end extending to the tip and constituting a part thereof, a rod movable in said central passage and having a shoulder for engaging said spring plate and moving it outwardly to engage the tip of the screw-driver in the slot of a screw head.

In testimony whereof I have hereunto affixed my signature.

ARCHIBALD R. LEMIEUX.